(12) United States Patent
Zopf et al.

(10) Patent No.: US 11,783,818 B2
(45) Date of Patent: Oct. 10, 2023

(54) TWO STAGE USER CUSTOMIZABLE WAKE WORD DETECTION

(71) Applicant: Cypress Semiconductor Corporation, San Jose, CA (US)

(72) Inventors: Robert Zopf, Rancho Santa Margarita, CA (US); Ashutosh Pandey, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 407 days.

(21) Appl. No.: 17/032,653

(22) Filed: Sep. 25, 2020

(65) Prior Publication Data
US 2021/0350798 A1    Nov. 11, 2021

Related U.S. Application Data

(60) Provisional application No. 63/020,984, filed on May 6, 2020.

(51) Int. Cl.
*G10L 15/06* (2013.01)
*G10L 15/183* (2013.01)
*G10L 15/10* (2006.01)
*G10L 15/22* (2006.01)
*G10L 15/08* (2006.01)

(52) U.S. Cl.
CPC .......... *G10L 15/183* (2013.01); *G10L 15/063* (2013.01); *G10L 15/10* (2013.01); *G10L 15/22* (2013.01); *G10L 2015/088* (2013.01)

(58) Field of Classification Search
CPC ..... G10L 15/07; G10L 15/063; G10L 15/142; G10L 15/144
See application file for complete search history.

(56) References Cited

U.S. PATENT DOCUMENTS

| | | | | |
|---|---|---|---|---|
| 5,390,278 A * | 2/1995 | Gupta | ................... | G10L 15/142 704/E15.032 |
| 5,710,864 A * | 1/1998 | Juang | ...................... | G10L 15/07 704/238 |
| 5,778,341 A * | 7/1998 | Zeljkovic | .............. | G10L 15/144 704/E15.033 |
| 5,937,384 A * | 8/1999 | Huang | .................. | G10L 15/144 704/254 |
| 6,185,528 B1 * | 2/2001 | Fissore | ................... | G10L 15/26 704/256.5 |
| 2006/0100874 A1 * | 5/2006 | Oblinger | ............... | G10L 15/144 704/E15.029 |

* cited by examiner

*Primary Examiner* — Feng-Tzer Tzeng

(57) ABSTRACT

Described herein are devices, methods, and systems for detecting a phrase from uttered speech. A processing device may determine a first model for phrase recognition based on a likelihood ratio using a set of training utterances. The set of utterances may be analyzed by the first model to determine a second model, the second model comprising a training state sequence for each of the set of training utterances, and wherein each training state sequence indicates a likely state for each time interval of a corresponding training utterance. A determination of whether a detected utterance corresponds to the phrase may be based on a concatenation of the first model and the second model.

21 Claims, 13 Drawing Sheets

TWO STAGE USER CUSTOMIZABLE WAKE WORD DETECTION

RELATED APPLICATIONS

This application claims priority to U.S. Provisional Patent Application No. 63/020,984, filed on May 6, 2020, the disclosure of which is hereby incorporated herein in its entirety.

TECHNICAL FIELD

The present disclosure relates generally to speech recognition systems, and more particularly to wake word detection.

BACKGROUND

An increasing number of modern computing devices feature speech recognition capabilities, allowing users to perform a wide variety of computing tasks via voice commands and natural speech. Devices such as mobile phones or smart speakers provide integrated virtual assistants that can respond to a user's commands or natural language requests by communicating over local and/or wide area networks to retrieve requested information or to control other devices, such as lights, heating and air conditioning controls, audio or video equipment, etc. Devices with speech recognition capabilities often remain in a low power consumption mode until a specific word or phrase is spoken (i.e., a wake word or wake phrase), allowing a user to control the device using voice commands after the device is thus activated.

To initiate a voice based user interface, wake-word detection (WWD) is commonly deployed. Here, a keyword or key-phrase is continuously monitored for and when detected, enables further voice based interaction. Early WWD systems employed the Gaussian Mixture Model-Hidden Markov Model (GMM-HMM) for acoustic modeling. More recently, deep learning or deep neural networks (NNs) have become an attractive choice due to their increased accuracy over traditional methods.

BRIEF DESCRIPTION OF THE DRAWINGS

The present embodiments are illustrated by way of example, and not of limitation, in the figures of the accompanying drawings.

DETAILED DESCRIPTION

Figure 1:
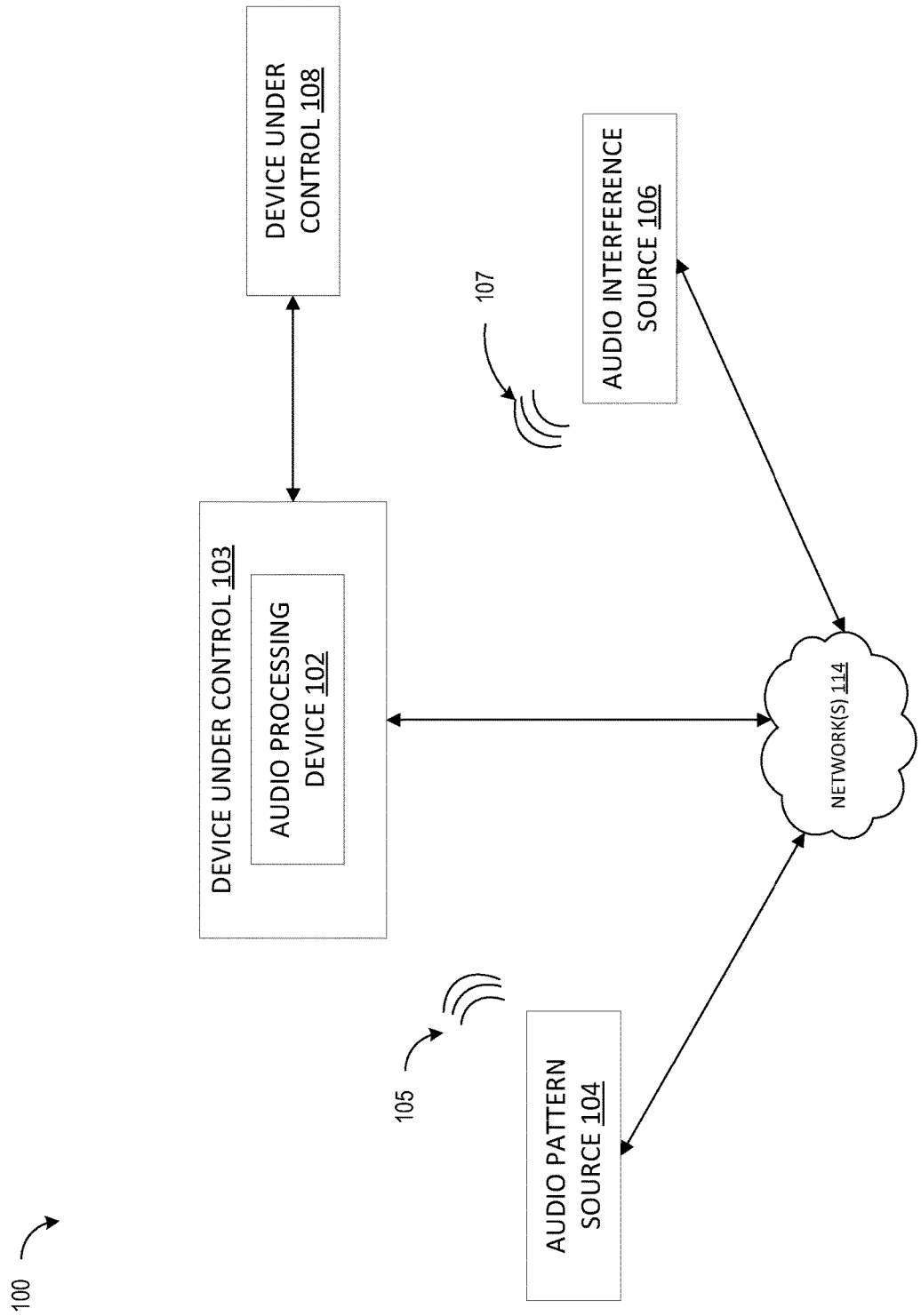
FIG. 1 is a block diagram illustrating a system, according to some embodiments of the present disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

As discussed above, to initiate a device using a wake word, wake-word detection (WWD) is commonly utilized. Most approaches employ a pre-selected wake word (e.g., "hello") that cannot be modified by the user, and requires tens of thousands of back-end training utterances. These pre-selected wake-words are trained offline and work for all speakers, and are thus, speaker independent. Detection of the wake word may be performed locally on the device and may then be verified by more complex algorithms in the cloud. Speaker identification is an added feature that can provide some level of security or customization (e.g., a user specific play list). However, speaker identification is a complex task that is generally performed in the cloud and requires a cumbersome enrollment phase (reading text).

Numerous personal devices such as headphones, hearable, wearables, cameras, etc now feature voice interfaces. These devices are typically used by very few or even a single user. Since they are battery powered, connectivity to the cloud is limited to conserve power. Therefore, it is desirable for functionality to remain local. Still, features such as wake-word detection and speaker identification are desirable as hands-free is an important advantage for many of these products. One approach to achieve these goals is to enable a user-personalized wake-word. By having users train their own (or alternatively a few talkers share training the same) wake-word, it becomes speaker-dependent and thus optimized for use by a specific speaker or a few speakers. Since these devices are used by a small number or even single user, speaker-independence is not necessarily a requirement. In addition, the customization of the wake-word inherently identifies the user and the secrecy of the user-customizable wake-word provides a level of security without requiring explicit and costly speaker identification. However, implementing such a system with as few training utterances as possible is challenging.

Deep learning or deep neural networks (NNs) have become an attractive choice due to their increased accuracy over traditional methods. However, these systems are trained offline for a fixed or given wake-word such as "hello." They require tens of thousands of utterances repeated by thousands of talkers. Some solutions do provide an option to later adapt to the user's voice (an enrollment phase, or adaptation based on use), but generally do not exhibit the ability to train for an arbitrary wake word (user customizable) with only a handful of training utterances. Other available solutions (e.g., isolated word training and detection) suffer from a sensitivity to "trick" phrases that share significant phonemes (or building block sounds) with the wake word. Indeed, such systems are subject to a relatively high degree of false detection with similar sounding words.

The embodiments described herein are directed at devices, methods, and systems for detecting a wake word from uttered speech. A processing device may determine a first model for wake word recognition based on a likelihood ratio using a set of training utterances. The set of utterances may be analyzed by the first model to determine a second model, the second model comprising a training state sequence for each of the set of training utterances, and wherein each training state sequence indicates a likely state for each time interval of a corresponding training utterance. A determination of whether a detected utterance corresponds to the wake word may be based on a concatenation of the first model and the second model. More specifically, the processing device may measure a distance between each training state sequence and a state sequence of the detected utterance to generate a set of distances and a minimum distance among the set of distances may be determined. The processing device may determine whether the detected utterance corresponds to the wake word based at least in part on the likelihood ratio of the detected utterance and a minimum distance among the set of distances.

FIG. 1 is a block diagram of a system 100 illustrating an audio processing device 102 communicatively coupled to other devices through one or more networks 114, in accordance with various embodiments. The audio processing device 102 is to facilitate audio pattern recognition and may control a device or application such as device 103 based on a recognized audio pattern. The audio processing device 102 is shown to receive sound waves 105 from an audio pattern source 104 and sound waves 107 from an audio interference source 106. The audio processing device 102 may itself emit audio interference (not shown) (e.g., through speakers).

The audio processing device 102 is also shown to interact with network(s) 114 through communication link(s). To facilitate pattern recognition, the audio processing device 102 provides noise cancellation to remove some or all of the audio interference using corresponding audio data received from audio interference source 106 over the networks(s) 114 or generated internally. In an embodiment, noise cancellation may be implemented using Independent Component Analysis (ICA) in which incoming signals (e.g., from a microphone) are separated by source (e.g., signals from the audio pattern source and the audio interference sources) then the audio data is compared with the separated signals to determine which should be removed to be left with an estimated audio pattern. Noise cancellation in other embodiments may utilize adaptive filters, neural networks, or any techniques known in the art that may be used to attenuate non-target components of a signal. In some embodiments, the audio processing device 102 may be integrated with a device under control 103 that it can control based on recognized audio patterns.

The audio pattern source 104 is to provide the sound waves 105 that correspond to a recognizable audio pattern (e.g., a wake word). In some embodiments, the audio pattern source 104 may interact with the network(s) 114 over the communication link(s). In some embodiments, an audio pattern is a predetermined audio pattern and/or an audio pattern that is recognizable by pattern recognition software or firmware associated with the audio processing device 102. The audio pattern source 104 may be animate (e.g., human) or an inanimate object (e.g., a machine).

Audio interference source 106 may be a source of the sound waves 107, that interfere with recognition of the audio patterns corresponding to the sound waves 105. The audio interference source 106 is shown to interact with the network(s) 114 over communication link(s). Audio interference source 106 may provide to the audio processing device 102 through the network(s) 114, audio data corresponding to the audio interference. Audio interference sources may include loudspeakers, televisions, video games, industrial sources of noise, or any other noise source whose sound output is or can be digitized and provided to the audio processing device 102 via the network(s) 114.

A second device under control 108 is shown to be coupled to the network(s) 114 via the link(s). Devices under control 108 and 103 may include any device with a function that can be initiated responsive to audio pattern recognition facilitated by the audio processing device 102. Example devices under control include white goods, home automation controllers, thermostats, lighting, automated blinds, automated door locks, automotive controls, windows, industrial controls and actuators. As used herein, devices under control may include any logic, firmware, or software application run by the device under control 110.

Network(s) 114 may include one more types of wired and/or wireless networks for communicatively coupling the network nodes of FIG. 1 to one another. For example, and not limitation, network(s) may include a wireless local area network (WLAN) (e.g., Wi-Fi, 802.11 compliant), PANs (e.g., Bluetooth SIG standard or Zigbee, IEEE 802.15.4 compliant), and the Internet. In an embodiment, the audio processing device 102 is communicatively coupled to the pattern recognition application 112 through Wi-Fi and the Internet. The audio processing device 102 may be communicatively coupled to the audio interference source 106 and to the device under control 108 through Bluetooth and/or Wi-Fi.

Figure 2:
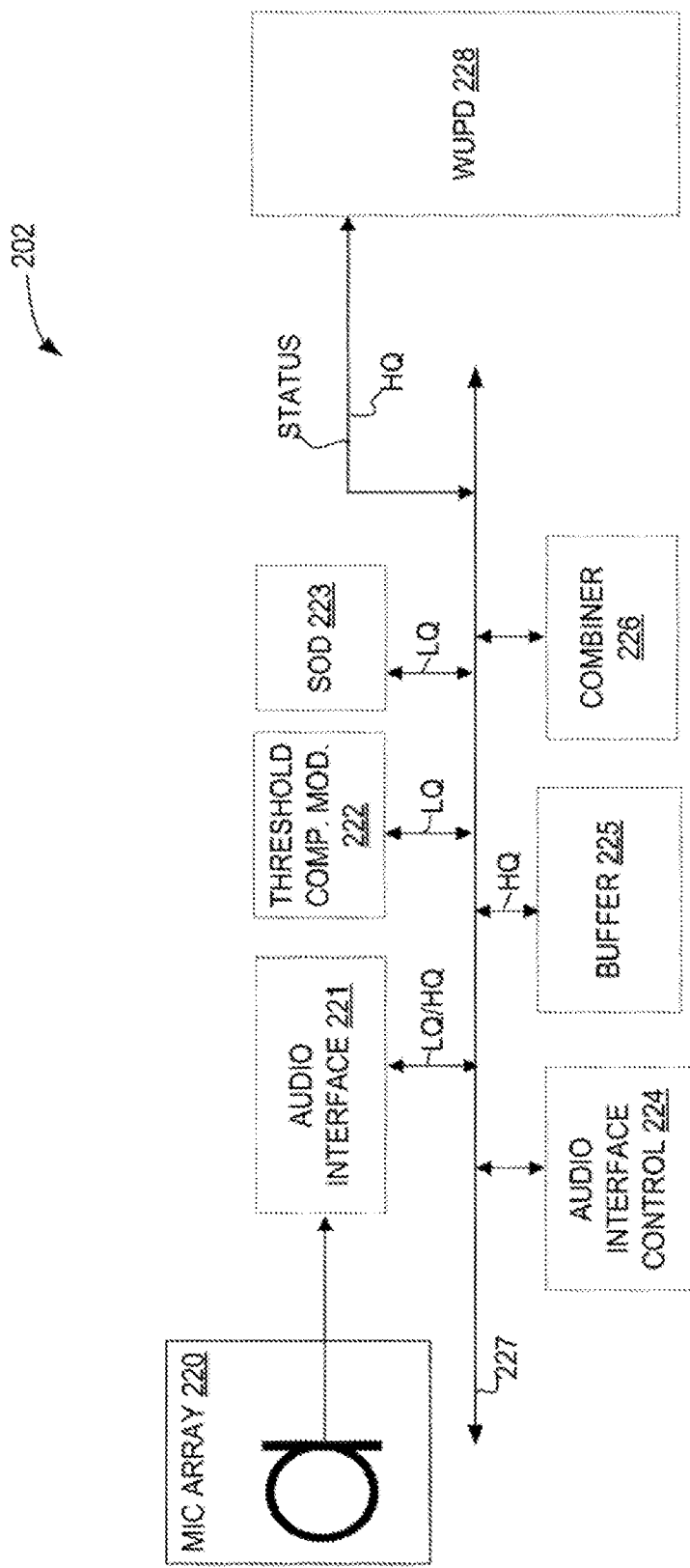
FIG. 2 is a block diagram illustrating an audio processing device, according to some embodiments of the present disclosure.

FIG. 2 is a block diagram illustrating components of an audio processing device 202, in accordance with embodiments. The audio processing device 202 may be of the Cypress PSoC family of microcontrollers developed by Cypress Semiconductor of San Jose, Calif. The audio processing device 202 is shown to include functional blocks including a microphone array 220, an audio interface 221, threshold computation module 222, speech onset detector SOD 223, audio interface control 224, buffer 225, combiner 226, and central processing unit (CPU) 228. Each functional block may be coupled to bus system 227 (e.g., I2C, I2S) and be implemented using hardware (e.g., circuitry), instructions (e.g., software and/or firmware), or a combination of hardware and instructions. In one embodiment, some or all of the audio processing device 202 is implemented by circuitry in an integrated circuit device (i.e., on a single integrated circuit substrate) or in a single device package. In alternative embodiments, the components of the audio processing device 202 are distributed among multiple integrated circuit devices, device packages, or other circuitry.

The microphone array 220 is to receive sound waves such as sound waves 105 and 107 of FIG. 1. Each microphone of the microphone array 220 includes a transducer or other mechanism (e.g., a including a diaphragm) to convert the energy of sound waves into an electronic signal or digital signal (e.g., audio data). Microphone array 220 may include one or more microphones and is sometimes referred to herein as microphone 220. When the sound waves 105 and 107 are received during a common period, the audio data includes components that correspond to both the sound waves 105 and 107. In some embodiments, one or more microphones of the array 220 may be a digital microphone. The microphone array 220 may be part of the audio interface 221 or a separate peripheral device that is external to the audio processing device 202 but coupled to the bus system 227. In some embodiments, the microphone array may include threshold/hysteresis settings for activity detection and measurement and/or processing logic to determine whether a sound wave received by the microphone array 220 meets or exceeds an activation threshold and whether corresponding audio data should be passed on to the SOD 223 for processing. In various embodiments, the threshold level of activity may be an energy level, an amplitude, a frequency, or any other attribute of a sound wave. The microphone array 220 may be coupled to a memory (not shown) that stores the activation threshold, which may be dynamically reprogrammable (e.g., by the threshold computation module 222).

Audio interface 221 includes circuitry to process and analyze the audio data received from the microphone array 220. In embodiments, audio interface 221 digitizes the electronic audio signals. Once digitized, audio interface 221 may provide signal processing (e.g., demodulation, mixing, filtering) to analyze or manipulate attributes of the audio data (e.g., phase, wavelength, frequency). The audio interface 221 may also perform beam forming and/or other noise suppression or signal conditioning methods to improve the performance in the presence of noise, reverberation, etc.

In one embodiment, the audio interface 221 includes a pulse density modulator (PDM) front end that is connected to the microphone array 220. In the PDM front end, the PDM generates a pulse density modulated bitstream based on an electronic signal from the microphone array 220. The PDM provides a clock signal to the microphone 220 that determines the initial sampling rate, then receives a data signal from the microphone 220 representing audio captured from the environment. From the data signal, the PDM generates a PDM bitstream and may provide the bitstream to a decimator, which can generate the audio data provided to the bus system 227 by either providing high quality audio data or by reducing a sample rate of the pulse density modulated bitstream from PDM to low quality audio data. In an alternative embodiment, the audio data source is an auxiliary analog to digital converter (AUX ADC) front end. In the auxiliary ADC front end, an analog to digital converter converts an analog signal from the microphone 220 to a digital audio signal. The digital audio signal may be provided to a decimator to generate the audio data provided to the bus system 227 by either providing high quality audio data or by reducing a sample rate of the digital audio signal from ADC to low quality audio data.

Audio interface control 224 is to control the timing of sampling by the audio interface 221 or the microphone array 220 and the sample rate of sampling by the audio interface 221 or the microphone array 220. For example, the audio interface control 224 may control the audio quality (e.g., sample rate) of audio data provided to the SOD 223 and to the buffer 225 and may also control the times at which such audio data should be provided periodically or continuously to the bus system 227. Although shown as a separate functional block, functionality of the audio interface control 224 may be performed by the SOD 223 and/or the buffer 225 or any other functional block.

The SOD 223 is to determine whether audio data received from the audio interface 221 is speech onset. The SOD 223 may use any of the speech onset detection algorithms or techniques known to those have ordinary skill in the art. In an embodiment, audio data with a reduced sample rate (e.g., 2-4 kHz) is sufficient for detecting speech onset (or other sound onset event) while allowing the SOD 223 to be clocked at a lower frequency, thus reducing the power consumption and complexity of the SOD 223. Upon detecting a speech onset event, the SOD 223 asserts a status signal on the bus 227 to wake the wake-up phrase detector (WUPD) 228 from a low power consumption state (e.g., sleep state) to a higher power consumption state (e.g., active state) to perform phrase detection, as will discussed further below. The gating of the WUPD 228 block in this way reduces the average system processing load and reduces the false acceptance rate (FAR) by minimizing the background noise and spurious audio that the WUPD 228 considers.

Threshold computation module 222 monitors ambient noise to dynamically compute and potentially readjust the activation threshold of audio that should trigger speech onset detection to avoid unnecessary processing by the SOD 223. In an embodiment, the audio interface control 224 causes the audio interface 221 to provide audio data (e.g., ambient noise) to the threshold computation module 222 periodically at intervals. In an embodiment, the threshold computation module 222 may reset the activation threshold level from below the current level of ambient noise to above the current level of ambient noise.

The buffer 225 is to store periodically sampled leading noise audio data. In an embodiment, the buffer 225 is sized to store slightly more than 250 milliseconds of audio data (e.g., 253 milliseconds) to accommodate combining as discussed below. Alternatively, or additionally, after the SOD 223 has detected speech onset, the buffer 225 may act as a channel to pass through the continuously sampled audio data comprising the wake phrase and the command or query. In an embodiment, the audio interface control 224 causes the audio interface 221 to provide leading noise to the buffer 225 periodically at intervals. Once the SOD 223 has detected speech like sound, the audio interface control 224 may cause the audio interface 221 to provide the remaining audio data to the buffer continuously.

The combiner 226 is to generate contiguous audio data using the periodically captured leading noise and the continuously captured the remaining audio data. In an embodiment, the combiner 226 stitches a portion of an end of the last periodically captured audio data with a portion of the beginning of the continuously captured audio data. For example, the combiner 226 may use an overlap add operation to overlap 3 milliseconds of the leading noise with the continuously captured audio data. The combiner 226 may output the contiguous audio data to the WUPD 228 via the bus system 227.

The WUPD 228 may determine whether the contiguous audio data output by the combiner 226 includes a wake word or wake phrase. When the WUPD 228 is activated, it may perform higher complexity and higher-powered computations (e.g., relative to SOD 223) to determine whether a wake-up word or phrase has been spoken, as discussed in further detail with respect to FIGS. 3A-8. The WUPD 228 may make this determination based on the audio data recorded in the buffer 225 (corresponding to a time prior to speech onset) and the high-quality audio data received after speech onset is detected.

Figure 3A:
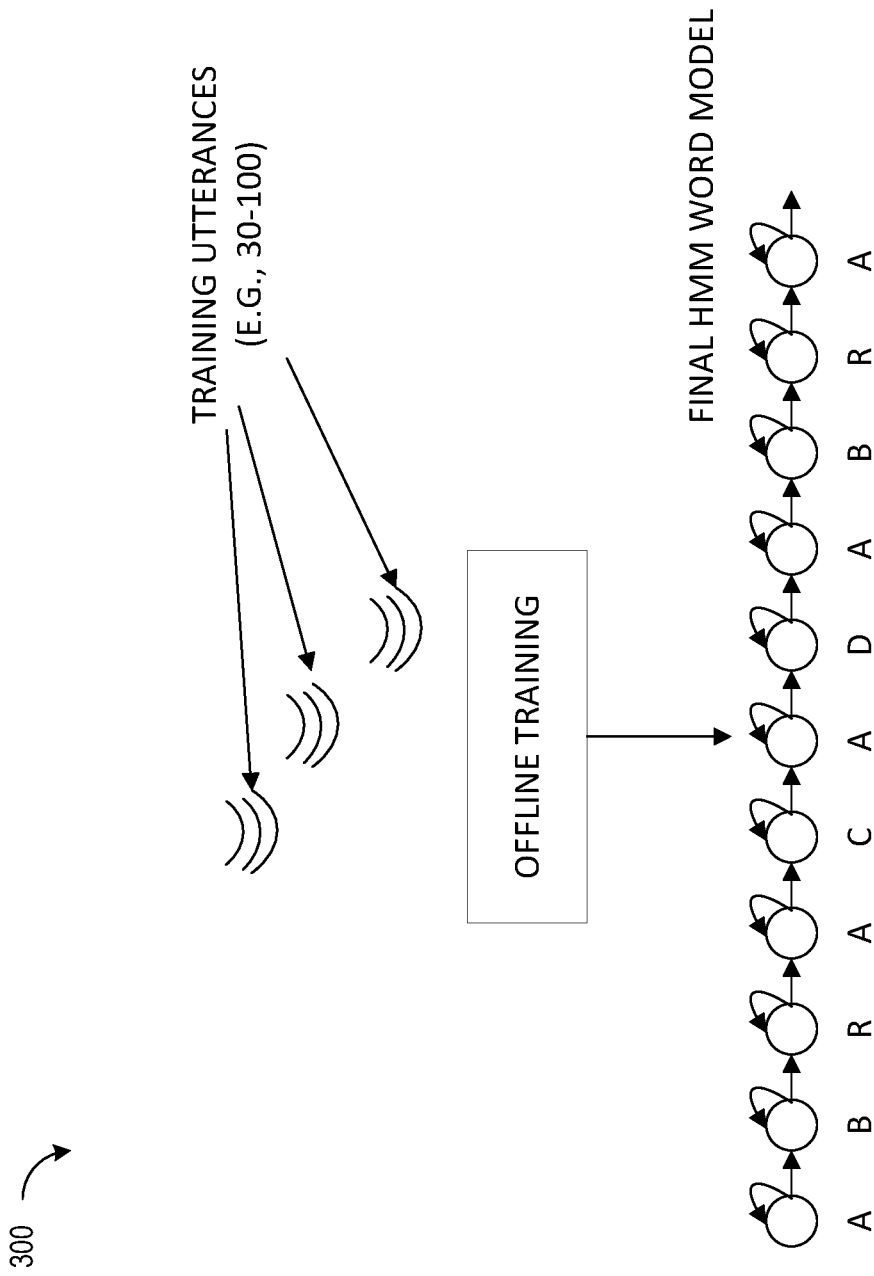
FIGS. 3A-3C illustrate wake word recognition model derivation processes, according to some embodiments of the present disclosure.

FIG. 3A illustrates a diagram of a traditional Gaussian Markov Model-Hidden Markov Model (GMM-HMM) wake word or word spotting approach 300, wherein whole word models for each wake word are trained using any appropriate algorithm such as the maximum-likelihood forward-backward algorithm. Gaussian observation models are determined by using either diagonal or full covariance structure, with diagonal structure the predominant approach. The word models may comprise a "left-to-right" linear sequence of states with e.g., approximately three states per phoneme. The observation vectors O are obtained through a front end spectral analysis, with Mel-frequency cepstral coefficients (MFCCs) and their derivatives being the most common. In a standard training approach, dozens to hundreds of utterances of the wake word are used in offline training to produce the final word model as depicted in FIG. 3A. During decoding, a user may wish to calculate the probability of the observation sequence, $O=O_1 O_2 \ldots O_T$ given the model), i.e. $P(O|\lambda)$. Any appropriate algorithm may be used to perform this calculation, such as the Viterbi algorithm.

Figure 3B:
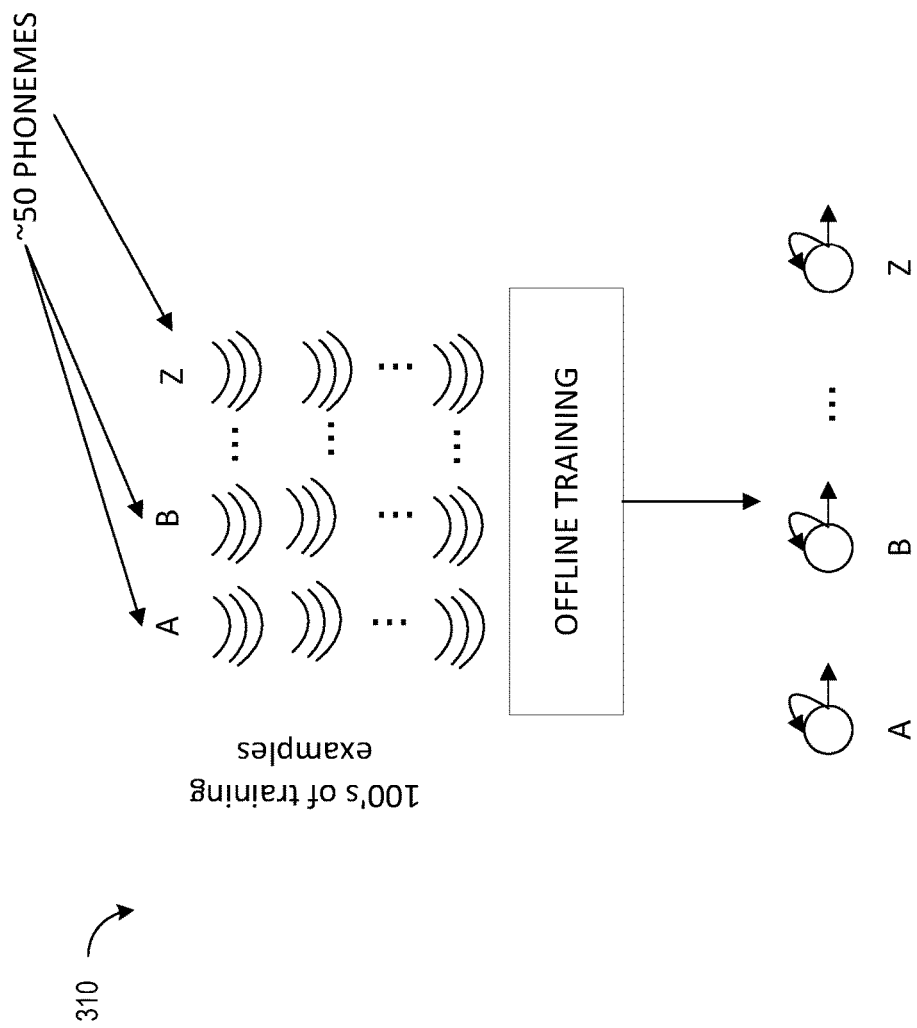

FIG. 3B illustrates a phoneme-based training approach 310, wherein individual phonemes are trained offline to create a phoneme database. It was found that a collection of about 50 of the most common phonemes is sufficient, with each phoneme modeled with 3 HMM states and 2 Gaussian mixtures per state. During wake-word training, the user utters the customized wake word a handful (e.g., 1-3) of times. These utterances, and optionally an augmented set, are used in the subsequent training process shown in FIG. 3C.

Figure 3C:
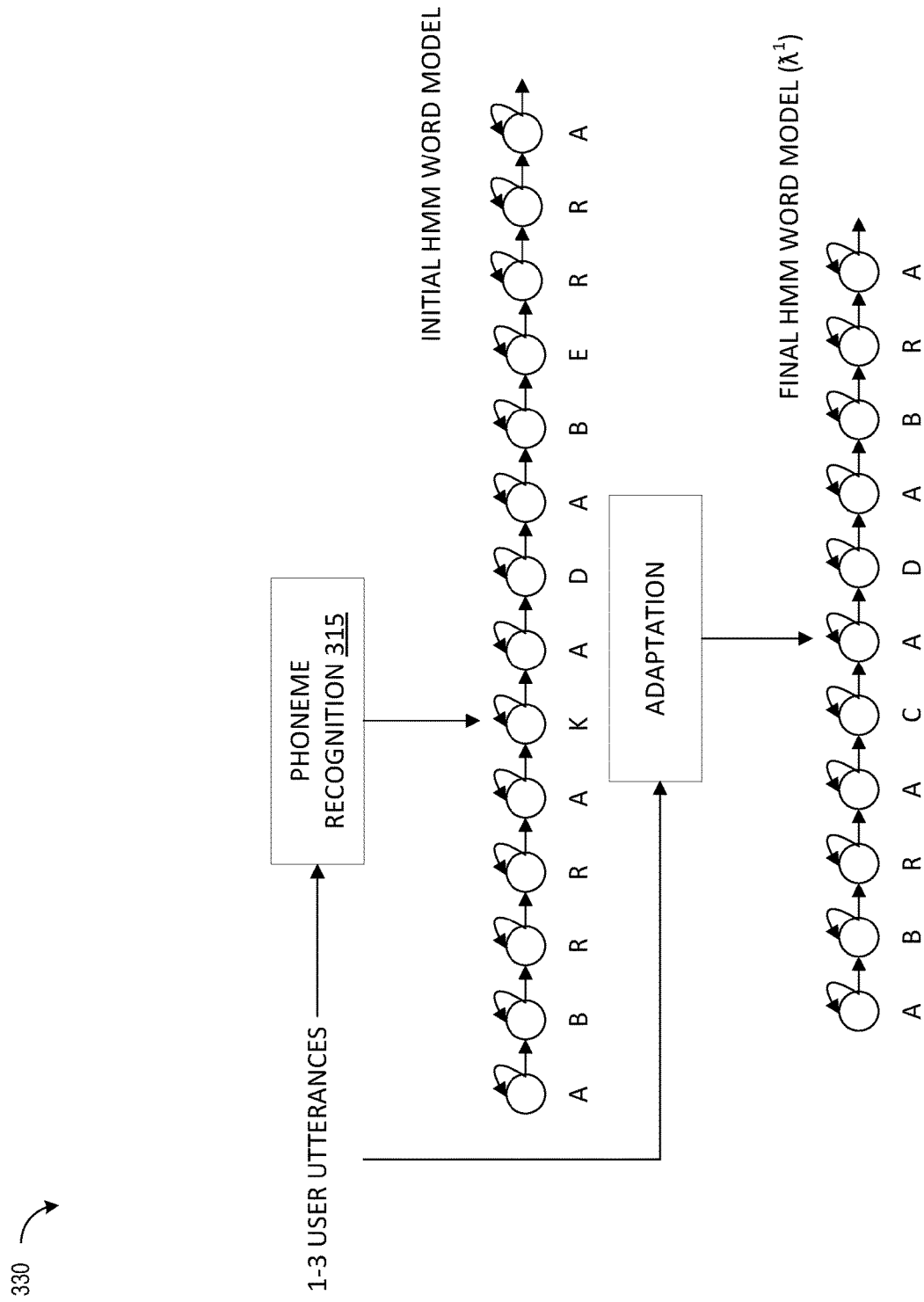

As shown in FIG. 3C, a phoneme recognition block 315 is used to determine the most likely phoneme decomposition for the uttered wake word "abracadabra," as shown in FIG. 3C. The models for the detected phonemes are then used to build an initial word-based model $\lambda^1$ for the wake word using a concatenated phoneme model based on phoneme transcriptions (one transcription for each instance of the phrase uttered).

Subsequently, the training utterances may be utilized again to adapt the initial word model towards the speaker, capture the inter-phoneme dependencies, and to reduce the concatenated model dimension. This training refines the speaker-independent concatenated-phoneme based model into a speaker-dependent word-based model. Pruning and state combining also occurs during adaptation to reduce the size of the model as also shown in FIG. 3C. State combining involves the merging of two or more similar or identical states with a very high likelihood of transition between them. In the example of FIG. 3C, the $3^{rd}$ and $4^{th}$ states of the initial HMM word model corresponding to "R" and "R" may be combined into a single "R" state, and states 11-13 of the initial HMM word model corresponding to "E" "R," and "R" may be combined into a single "R" state.

Figure 3D:
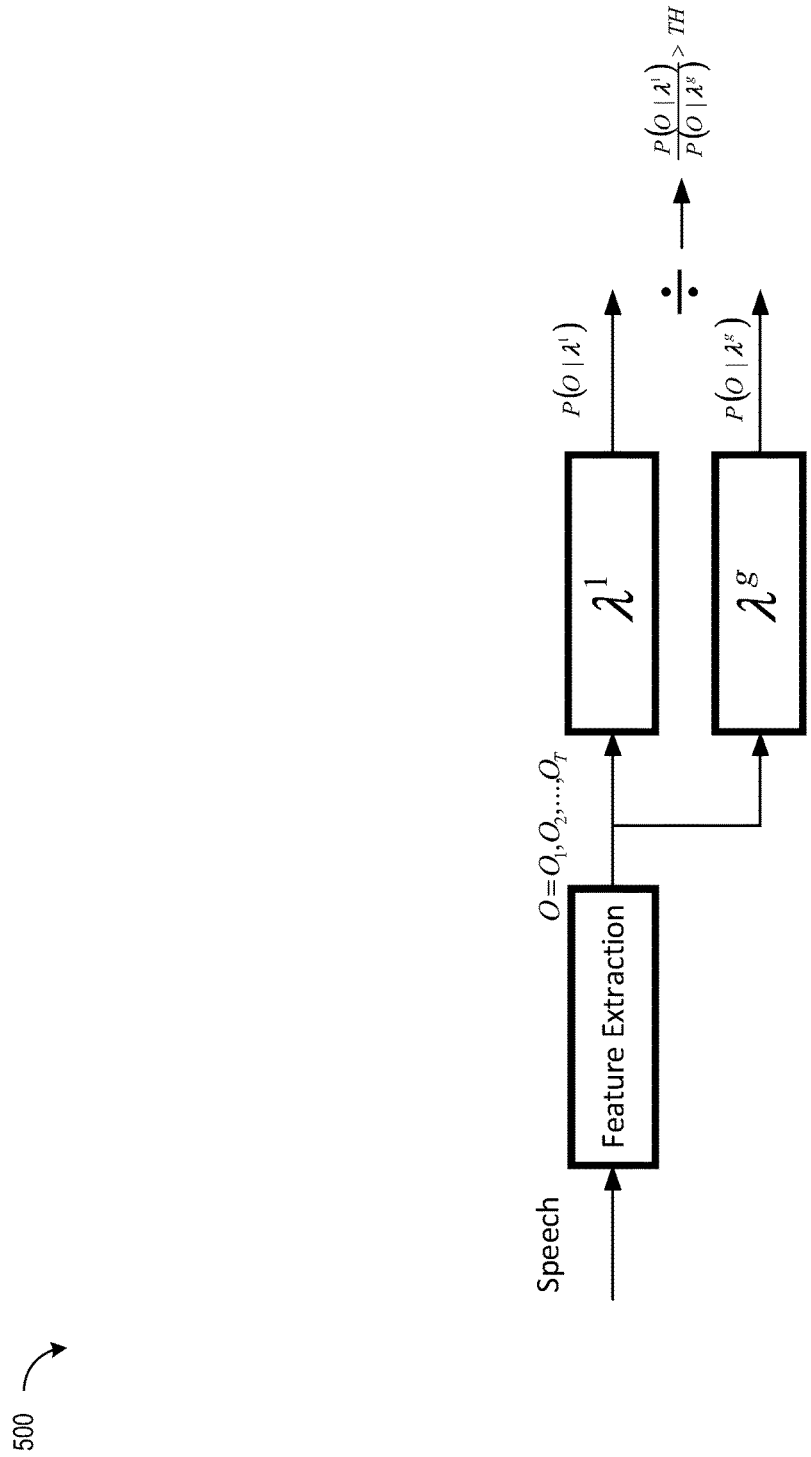
FIG. 3D illustrates a traditional wake word recognition process, according to some embodiments of the present disclosure.

In the standard approach, once the model is obtained, it is used to evaluate speech observations (O) (also referred to herein as utterances) and if the probability that an observation sequence has been detected exceeds a threshold, TH, given the model, $\lambda^1$, normalized by the probability given a garbage or background model, $\lambda^g$, then the wake-word is detected. This process is depicted in FIG. 3D.

The likelihood ratio, LR, is defined as:

$$LR(0, \lambda, \lambda^g) = \frac{P(0|\lambda)}{P(0|\lambda^g)}$$

Stated differently, the LR may be based on how well the observation O matches the model $\lambda^1$ compared to how closely the observation O matches the garbage model $\lambda^g$. However, this approach does not capture anything about how $\lambda^1$ models O other than the final probability. In many cases, falsely accepted words may exhibit a partial phoneme match, or contain a full matching subset of phonemes. Such an utterance typically has a very high LR because all the phones match and a vowel is held. Relying solely on the LR in this instance would result in a false acceptance. Another common false acceptance scenario is where the word matches part of the wake-word. Embodiments of the present disclosure overcome the above problems by incorporating how the model is excited internally throughout the duration of the input observation sequence into the model training and decision-making process. In the case of an HMM-GMM model, one such excitation is the most likely state.

Figure 4A:
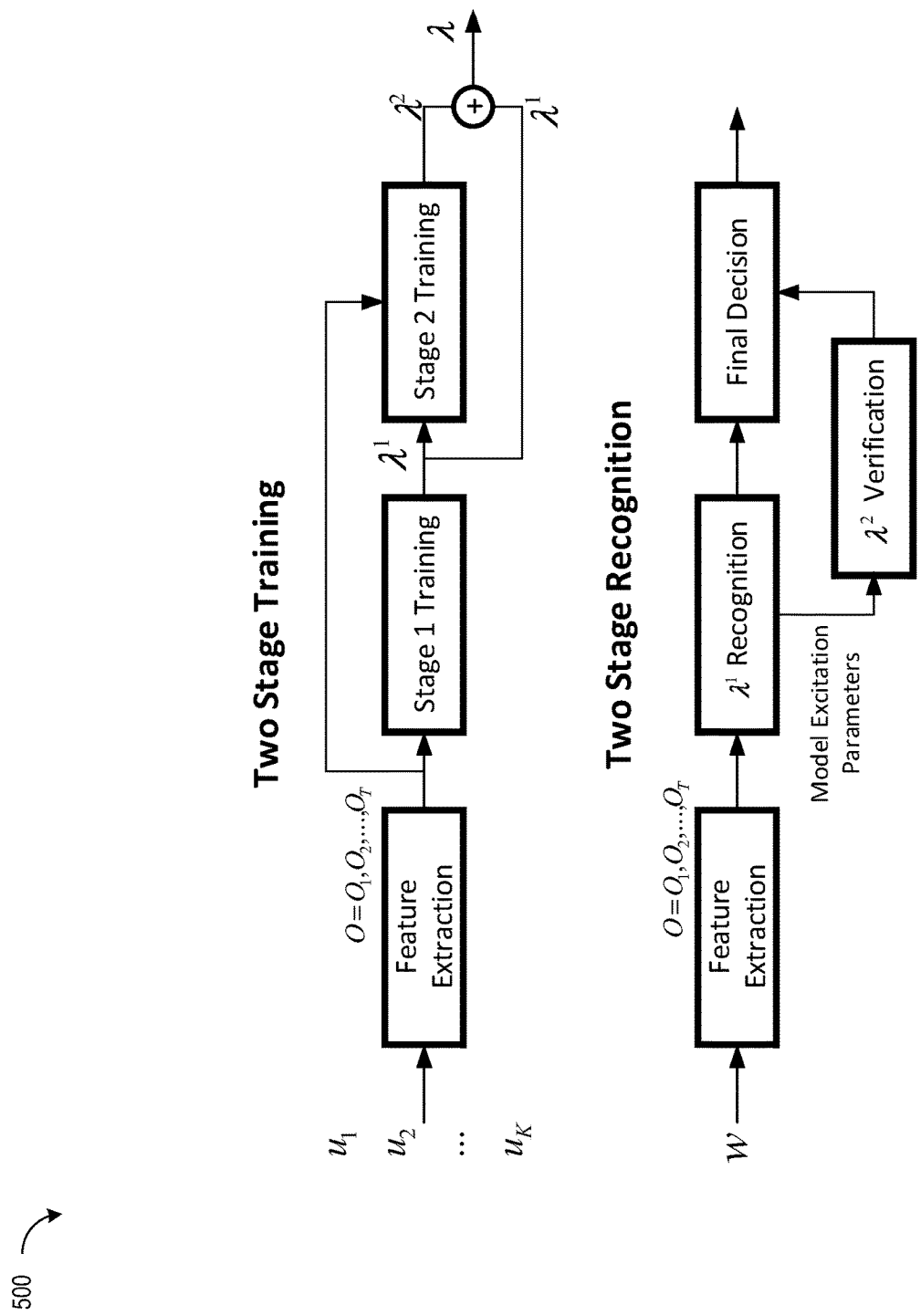
FIG. 4A illustrates a 2 stage model training and 2 stage wake word recognition process, according to some embodiments of the present disclosure.
Figure 4B:
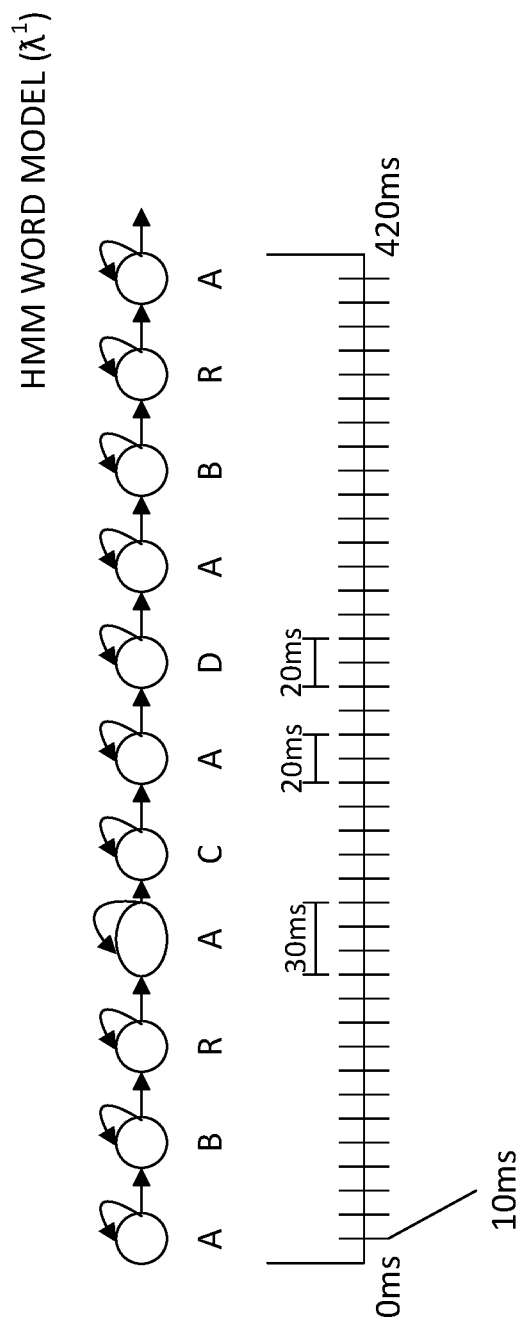
FIG. 4B illustrates a wake word recognition model, according to some embodiments of the present disclosure.

FIG. 4A illustrates a model generation training approach in accordance with some embodiments of the present disclosure. Upon obtaining the model $\lambda^1$ (as discussed above with respect to FIGS. 3B-3D), the audio processing device 202 may undertake a second stage of training by processing the training utterances with the model $\lambda^1$ to obtain, for each training utterance, a state sequence indicating the most likely state (e.g., the particular phoneme model) at each time interval over the course of the training utterance that will form the basis of a stage 2 model $\lambda^2$. For example, each training utterance may last 420 milliseconds and may be captured in 10 millisecond frames (e.g., 10 millisecond time intervals). The state sequence may indicate the most likely state (e.g., the particular phoneme model) that the training utterance will be in at each particular frame of the utterance (e.g., as we transition through the model). As shown in FIG. 4B, the model $\lambda^1$ may be an 11 state model captured over 420 ms at 10 millisecond time intervals. FIG. 4B also illustrates the varying length of time of each state. As shown in the example of FIG. 4B, each state may last for 20 ms except for the $4^{th}$ state ("A") which is shown to last for 30 ms. A state sequence may indicate the likelihood of staying in a current state or transitioning to a new state at each time interval.

Referring back to FIG. 4A, the audio processing device 202 may solve for the individually most likely state $q_t$, in the N state model $\lambda^1$, at time t, as:

$$q_t = \underset{1 \le i \le N}{\mathrm{argmax}}[\gamma_t(i, O_t, \lambda^1)],$$

$$1 \le t \le T$$

If $u_k$ is the $k^{th}$ training utterance of K total training utterances, and $O_t^{u_k}$ is the corresponding observation sequence, then the audio processing device 202 may determine the most likely state sequence for each training utterance, $u_k$, during training as:

$$q_t^{u_k} = \underset{1 \le i \le N}{\mathrm{argmax}}[\gamma_t(i, O_t^{u_k}, \lambda^1)],$$

$$1 \le t \le T$$

The audio processing device 202 may create a second stage model, $\lambda^2$, by collecting the state sequences for each of the K training utterances:

$$\lambda^2 = \{q_t^{u_k}\} \; k=1 \ldots K$$

The audio processing device 202 may then generate the final model, $\lambda$, by concatenating the stage 1 and stage 2 ($\lambda^1$ and $\lambda^2$) models:

$$\lambda = \{\lambda^1, \lambda^2\}$$

Although the model $\lambda^2$ is obtained as described above, any appropriate method may be used. For example, the audio processing device 202 may utilize a statistical approach to obtain the sum distribution of each state over time. FIG. 4A also illustrates a 2 stage recognition process in accordance with some embodiments of the present disclosure. The audio processing device 202 may perform recognition of a detected utterance using model $\lambda^1$ (e.g., based on the LR) in conjunction with model $\lambda^2$. For example, upon making a recognition decision using model $\lambda^1$, the audio processing device 202 may subsequently verify the result of recognition using model $\lambda^1$ using model $\lambda^2$. To verify, the audio processing device 202 may determine a distance between each of the K state sequences and the state sequence of the detected utterance (e.g., the utterance under recognition), thereby generating K distances, and determine the minimum distance among the K distances, which is computed as:

$$Dq\min_u = \min_{1 \le k \le K} D(q_t^{u_k}, q_t)$$

The audio processing device 202 may incorporate this minimum distance measurement into the final decision:

Final Decision=$f(Dq \min_u, LR(O, \lambda^1, \lambda^g))$

The audio processing device 202 may compare the $Dq\min_u$ to a threshold and if the $Dq\min_u$ exceeds the threshold it determine that the detected utterance it not the wake-word. In some embodiments, the audio processing device 202 may assign a weight to the $Dq\min_u$, so that it has more or less effect on the final decision based on e.g., a user preference. It should be noted that although the examples above are described with respect to the use of $Dq\min_u$ and LR $(O, \lambda^1, \lambda^2)$, to determine whether a detected utterance corresponds to a wake-word, in some embodiments the audio processing device 202 may utilize only model $\lambda^2$ (e.g., only the $Dq\min_u$) in determining whether a detected utterance corresponds to the wake-word.

Figure 5:
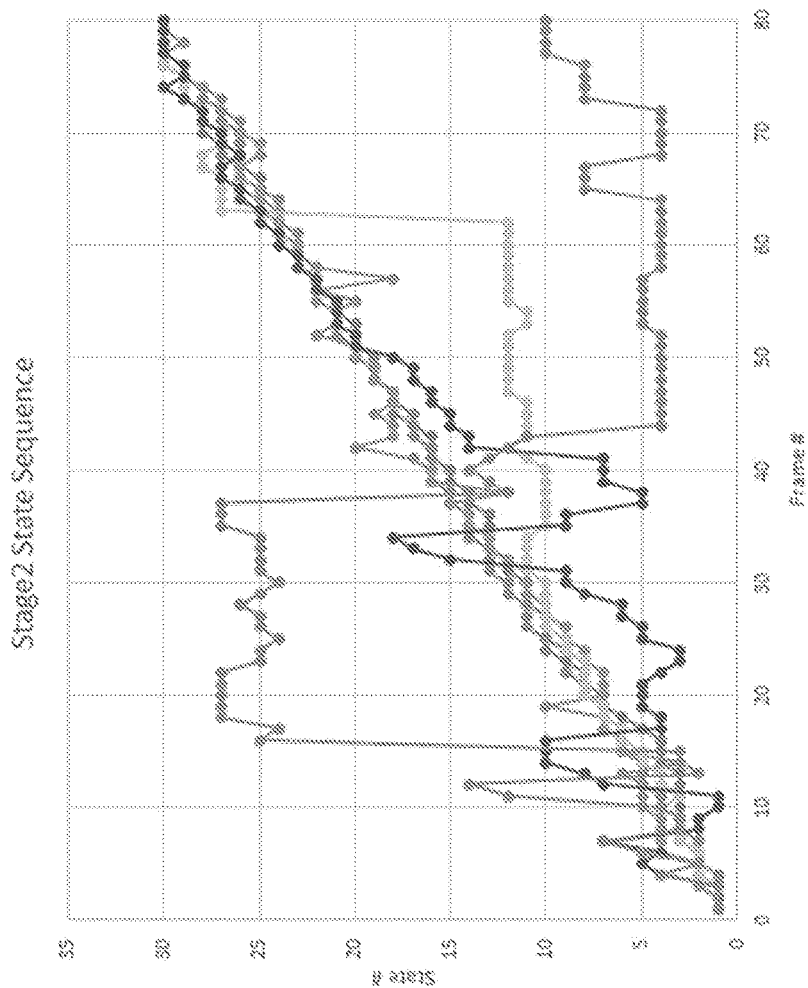
FIG. 5 illustrates a graph of state sequences of various utterances, according to some embodiments of the present disclosure.

FIG. 5 illustrates state sequences for a variety of different utterances. The reference $q_t^{u_k}$ for one of the training utterances for "abracadabra" is labeled "Reference." The "Reference" $q_t^{u_k}$ may correspond to the training utterance having the minimum distance ($Dq\min_u$) from the state sequence of the utterance under recognition. A recognition wake-word that that is the same word as the training utterance (e.g., "abracadabra") is labeled "WW" and tracks the "Reference" state sequence well as shown. Another wake-word that that is the same word as the training utterance but is under the influence of noise is labeled "WW-Noise." As can be seen, "WW-Noise" exhibits some minor state mismatches but still tracks the state sequence of "Reference" well overall. In noise, the LR is generally lower than in quiet conditions, while the state sequence exhibits only minor increase in distance score, thus enhancing detection ability in noisy environments.

In many cases, false acceptance words may exhibit a partial phoneme match, or contain a full matching subset of phonemes. For example, the utterance "Abraaaaaaaaaaaaaabra" is shown in FIG. 5 and is labeled "Abraaaaaaaaaaaaaabra." In this case, the state sequence for "Abraaaaaaaaaaaaaabra" matches well at the beginning but then is held around the states representing the "a." The state sequence matches well again near the end of the utterance. Such an utterance typically has a very high LR because all the phones match and a vowel is held. Relying solely on the LR in this instance may result in a false acceptance. However, using the $Dq\min_u$ shows that there is a considerable distance between the state sequence of "Abraaaaaaaaaaaaaabra" at frames 30-63 and the state sequence of "Reference" at frames 30-63. Thus, the audio processing device 202 may reject the utterance "Abraaaaaaaaaaaaaabra." Another common false acceptance scenario is where the utterance matches part of the wake-word. This is illustrated by the state sequence labeled "Updowncadabra" in FIG. 5. The mismatched portion of the state sequence for Updowncadabra" exhibits poor matching to the state sequence of "Reference" at the corresponding frames, resulting in a high distance score and rejection. Finally, a completely mismatched utterance labeled "California" is shown. Such an utterance would likely also exhibit a very low LR in addition to tracking the state sequence of "Reference" poorly throughout.

In some embodiments, model $\lambda^2$ may be based on other parameters alternatively or in addition to the distance measurement between each of the K state sequences and the state sequence of the utterance being recognized. One such parameter may be how the likelihood ratio, LR, evolves over time with each observation, $O_t$. Upon obtaining the model $\lambda^1$ (as discussed above with respect to FIGS. 3B-3D), the audio processing device 202 may undertake a second stage of training by processing the training utterances $u_k$ with the model $\lambda^1$ to determine how the likelihood ratio, LR, of each training utterance evolves over time with each observation $O_t$. The probability of being in state $S_i$ at time t, given the observation sequence $O_t=O_1, \ldots, O_t$, and the model $\lambda^1$, is given by:

$$\gamma_t(i, O_t, \lambda^1) = P(q_t = S_i | O_t, \lambda^1)$$

The maximum probability at any state within the model $\lambda^1$ at time t is then given by:

$$P\max_t(O_t, \lambda^1) = \max_{1 \le i \le N} \gamma_t(i, O_t, \lambda^1) \; 1 \le t \le T$$

Processing each training utterance $u_k$ then gives:

$$P\max_t^{u_k} = P\max_t(O_t^{u_k}, \lambda^1)$$

$$Pg\max_t^{u_k} = P\max_t(O_t^{u_k}, \lambda^g)$$

and thus the audio processing device 202 may determine the likelihood ratio (LR) of a training utterance over time as:

$$LR_t^{u_k} = \frac{P\max_t^{u_k}}{Pg\max_t^{u_k}}$$

The audio processing device 202 may then generate a second stage model, $\lambda^2$, as:

$$\lambda^2 = \{LR_t^{u_k}\} \; k=1 \ldots K$$

During recognition of a received utterance, the audio processing device 202 may compute a distance measure, D, between each $LR_t^{u_k}$ and $LR_t$ (representing the likelihood ratio of the received utterance over time) to generate K distance measures. The audio processing device 202 may then use the minimum distance amongst all the K distance measures (e.g., among all training utterances), $Dmin_u$, along with the likelihood ratio, $LR(O,\lambda^1,\lambda^g)$ to calculate the final decision:

$$Dmin_u = \min_{1 \le k \le K} D(LR_t^{u_k}, LR_t)$$

$$\text{Final Decision} = f(Dmin_u, LR(O, \lambda^1, \lambda^g))$$

The audio processing device 202 may compare the $Dmin_u$ to a threshold and if the $Dmin_u$ exceeds the threshold it determine that the detected utterance it not the wake-word. In some embodiments, the audio processing device 202 may assign a weight to the $Dmin_u$, so that it has more or less effect on the final decision based on e.g., a user preference. In some embodiments, the audio processing device 202 may incorporate both stage 2 recognition parameters discussed above into the final decision:

Final Decision=$f(Dq\ min_u, D\ min_u, LR(O,\lambda^1,\lambda^g))$

Other parameters may also be used alternatively to or in conjunction with the likelihood ratio over time and the state sequence. Examples of such parameters may include voicing measure, pitch, and frame energy, among others. In addition, the models $\lambda^1$ and $\lambda^2$ may not be limited to HMM-GMM models, but may also comprise neural networks, or any other appropriate model type.

Figure 6:
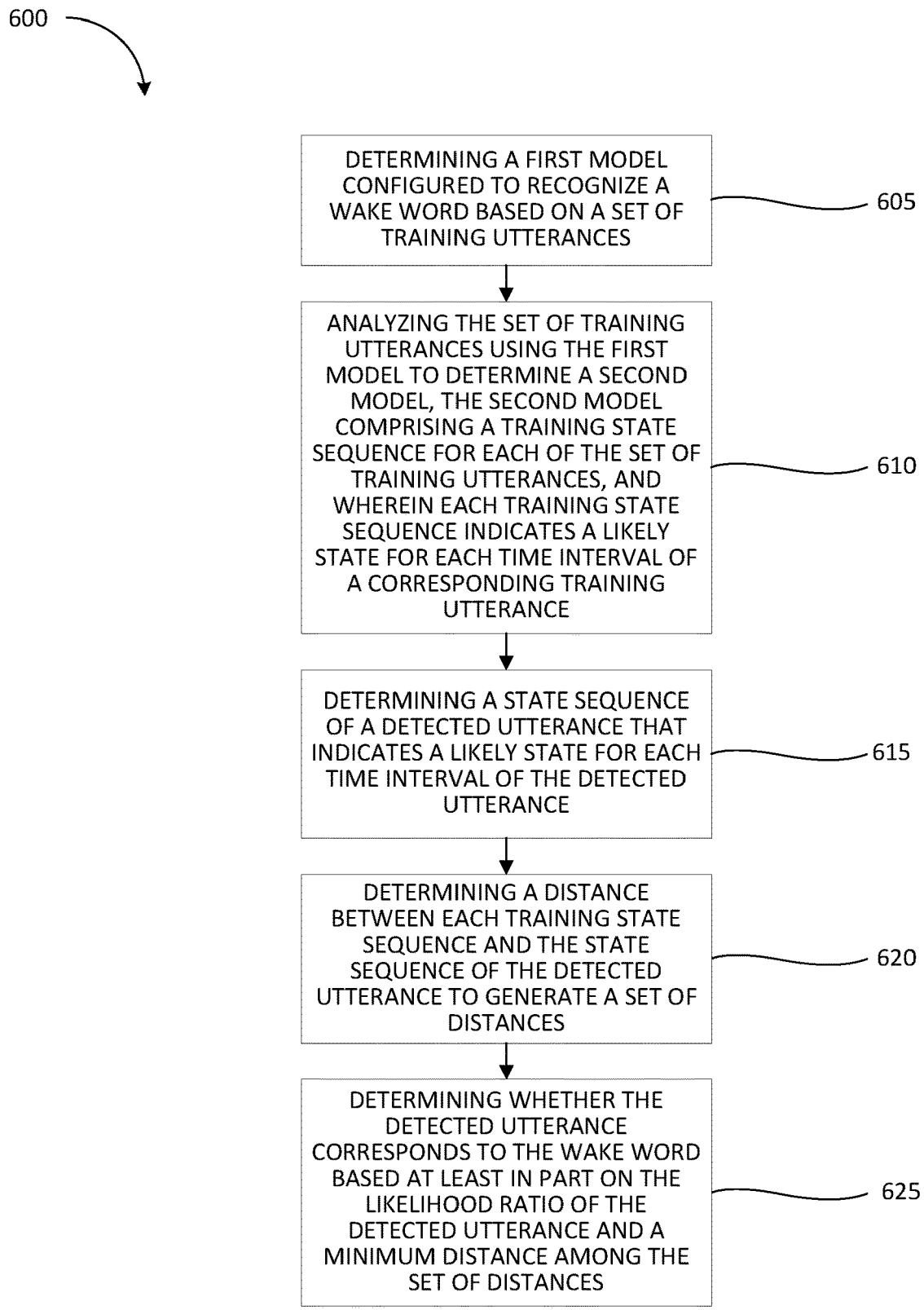
FIG. 6 illustrates a flow diagram of a method for recognizing a wake word, in accordance with some embodiments of the present disclosure.

FIG. 6 is a flow diagram of a method 600 of detecting a wake-word, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 600 may be performed by audio processing device 202 executing wake-word detection firmware.

Referring also to FIG. 2, at block 605, the audio processing device 202 may determine a first model configured to recognize a wake word based on a set of training utterances. At block 610, the audio processing device 202 may analyze the set of training utterances using the first model to determine a second model, the second model comprising a training state sequence for each of the set of training utterances, and wherein each training state sequence indicates a likely state for each time interval of a corresponding training utterance. At block 615, the audio processing device 202 may determine a state sequence of a detected utterance that indicates a likely state for each time interval of the detected utterance. At block 620, the audio processing device 202 may determine a distance between each training state sequence and the state sequence of the detected utterance to generate a set of distances. At block 625, determining whether the detected utterance corresponds to the wake word based at least in part on the likelihood ratio of the detected utterance and a minimum distance among the set of distances.

Figure 7:
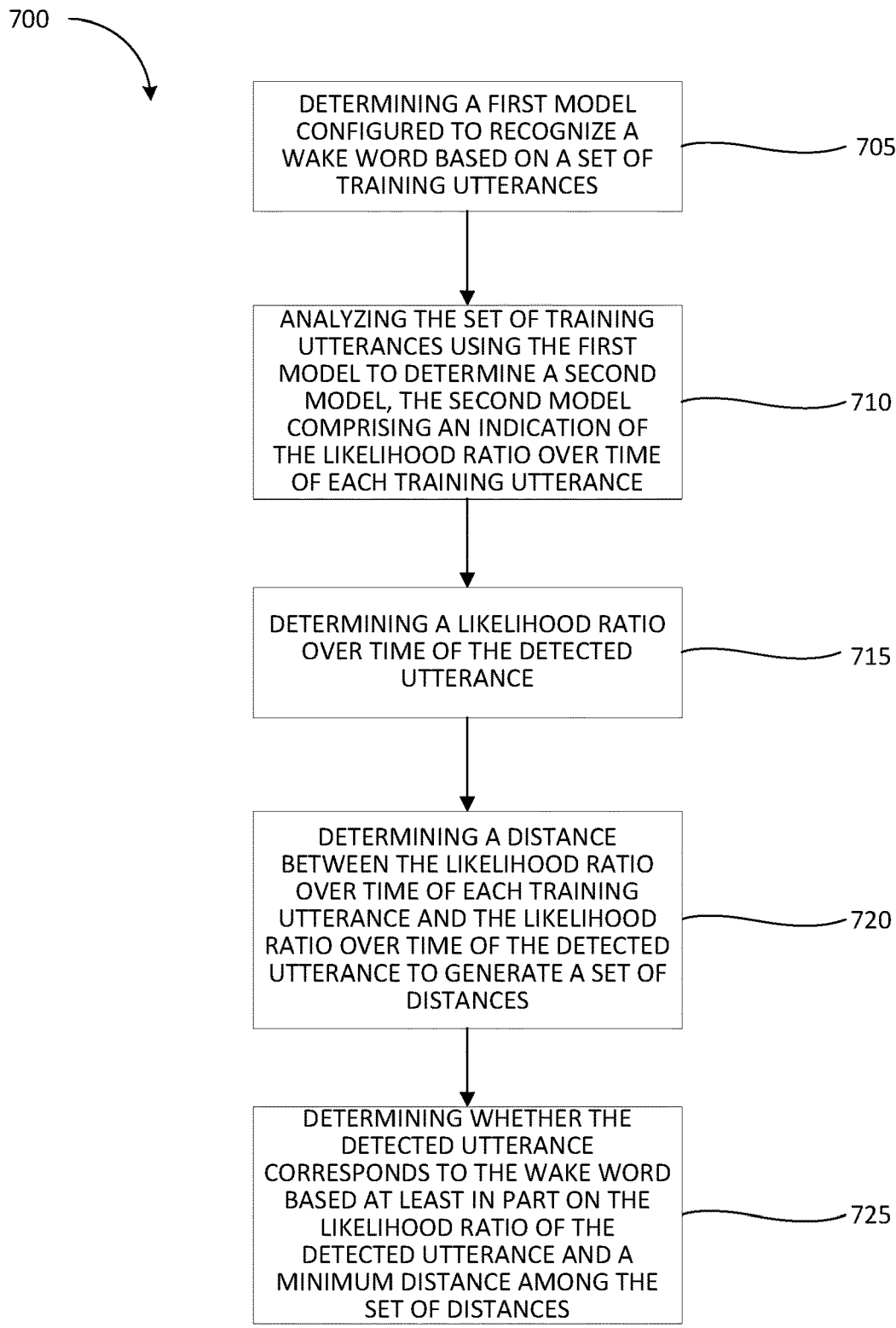
FIG. 7 illustrates a flow diagram of a method for recognizing a wake word, in accordance with some embodiments of the present disclosure.

FIG. 7 is a flow diagram of a method 700 for detecting a wake word, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 700 may be performed by audio processing device 202 executing wake word detection firmware.

Referring simultaneously to FIG. 2, at block 705, the audio processing device 202 may determine a first model configured to recognize a wake word based on a set of training utterances. at block 710, the audio processing device 202 may analyze the set of training utterances using the first model to determine a second model, the second model comprising an indication of the likelihood ratio over time of each training utterance. At block 715, the audio processing device 202 may determine a likelihood ratio over time of the detected utterance and at block 720 may determine a distance between the likelihood ratio over time of each training utterance and the likelihood ratio over time of the detected utterance to generate a set of distances. At block 725, the audio processing device 202 may determine whether the detected utterance corresponds to the wake word based at least in part on the likelihood ratio of the detected utterance and a minimum distance among the set of distances.

Figure 8:
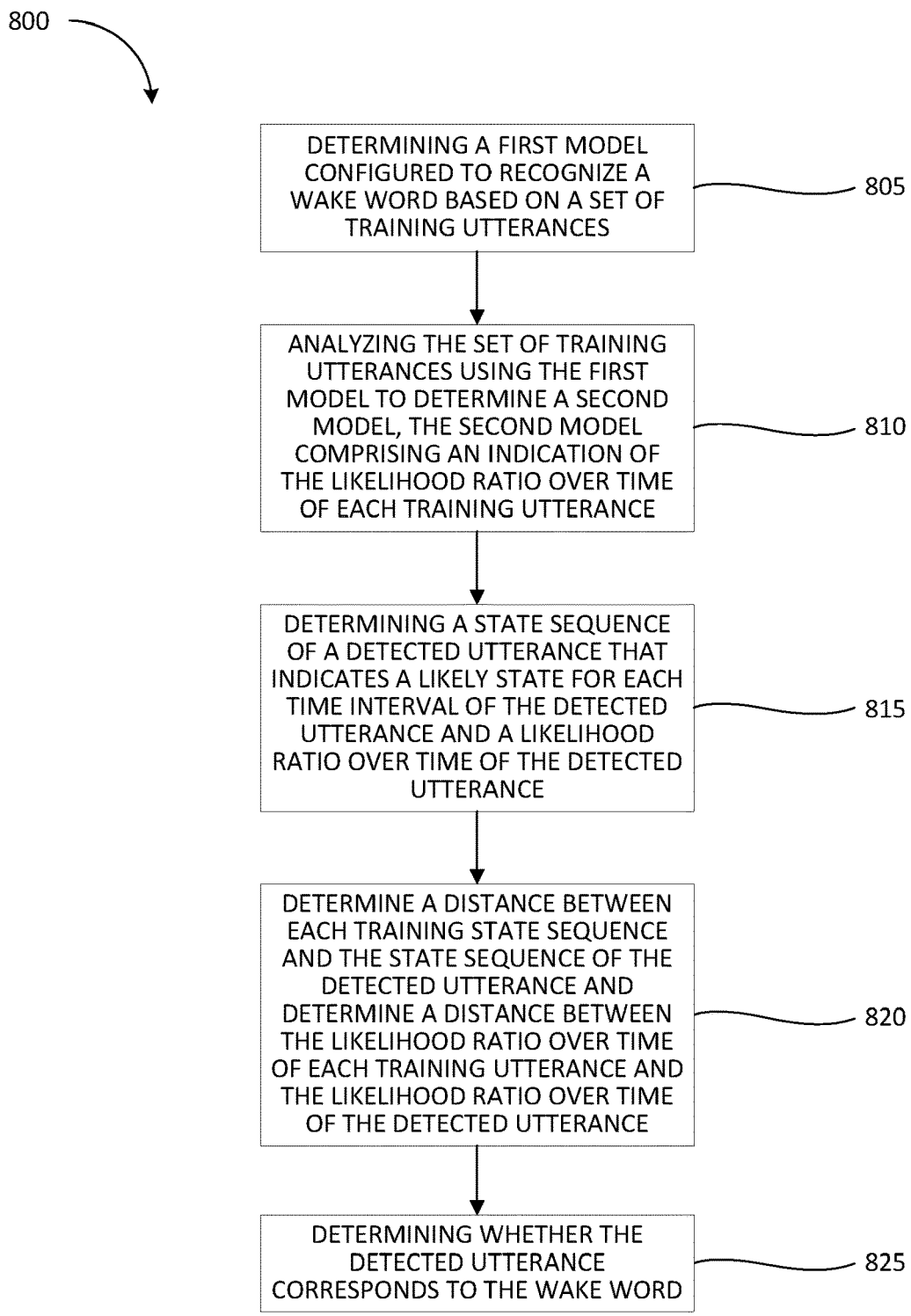
FIG. 8 illustrates a flow diagram of a method for recognizing a wake word, in accordance with some embodiments of the present disclosure.

FIG. 8 is a flow diagram of a method 800 for detecting a wake word, in accordance with some embodiments. Referring also to FIG. 2, at block 805, the audio processing device 202 may determine a first model configured to recognize a wake word based on a set of training utterances. At block 810, the audio processing device 202 may analyze the set of training utterances using the first model to determine a second model, the second model comprising a training state sequence for each of the set of training utterances, and wherein each training state sequence indicates a likely state for each time interval of a corresponding training utterance. The second model may further comprise an indication of the likelihood ratio over time of each training utterance. At block 815, the audio processing device 202 may determine a state sequence of a detected utterance that indicates a likely state for each time interval of the detected utterance. The audio processing device 202 may further determine a likelihood ratio over time of the detected utterance. At block 820, the audio processing device 202 may determine a distance between each training state sequence and the state sequence of the detected utterance to generate a first set of distances. The audio processing device 202 may further determine a distance between the likelihood ratio over time of each training utterance and the likelihood ratio over time of the detected utterance to generate a second set of distances. At block 825, the audio processing device 202 may determine whether the detected utterance corresponds to the wake word based at least in part on the likelihood ratio of the detected utterance, a minimum distance among the first set of distances ($Dqmin_u$), and a minimum distance among the second set of distances ($Dmin_u$).

Figure 9:
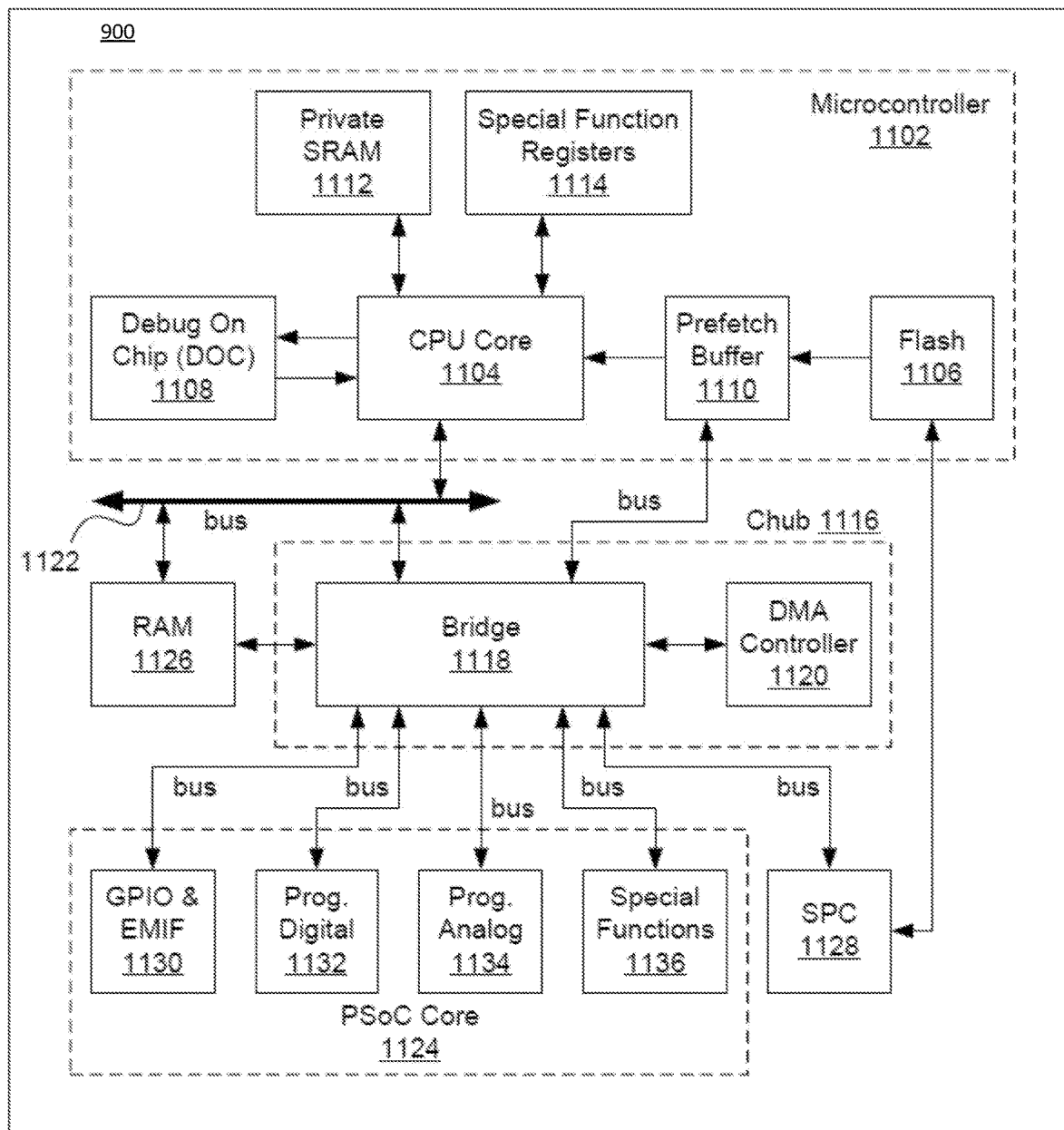
FIG. 9 illustrates an embodiment of a core architecture of the Programmable System-on-Chip (PSoC®) processing device.

FIG. 9 illustrates an embodiment of a core architecture 900 of the PSoC® processing device, such as that used in the PSoC3® family of products offered by Cypress Semiconductor Corporation (San Jose, Calif.). In one embodiment, the core architecture 900 includes a microcontroller 1102. The microcontroller 1102 includes a CPU (central processing unit) core 1104 (which may correspond to processing device 130 of FIG. 1), flash program storage 1106, DOC (debug on chip) 1108, a prefetch buffer 1110, a private SRAM (static random access memory) 1112, and special functions registers 1114. In an embodiment, the DOC 1108, prefetch buffer 1110, private SRAM 1112, and special function registers 1114 are coupled to the CPU core 1104 (e.g., CPU core 1006), while the flash program storage 1106 is coupled to the prefetch buffer 1110.

The core architecture 1100 may also include a CHub (core hub) 1116, including a bridge 1118 and a DMA controller 1120 that is coupled to the microcontroller 1102 via bus 1122. The CHub 1116 may provide the primary data and control interface between the microcontroller 1102 and its peripherals (e.g., peripherals) and memory, and a programmable core 1124. The DMA controller 1120 may be programmed to transfer data between system elements without burdening the CPU core 1104. In various embodiments, each of these subcomponents of the microcontroller 1102 and CHub 1116 may be different with each choice or type of CPU core 1104. The CHub 1116 may also be coupled to shared SRAM 1126 and an SPC (system performance controller) 1128. The private SRAM 1112 is independent of the shared SRAM 1126 that is accessed by the microcontroller 1102 through the bridge 1118. The CPU core 1104 accesses the private SRAM 1112 without going through the bridge 1118, thus allowing local register and RAM accesses to occur simultaneously with DMA access to shared SRAM 1126. Although labeled here as SRAM, these memory modules may be any suitable type of a wide variety of (volatile or non-volatile) memory or data storage modules in various other embodiments.

In various embodiments, the programmable core 1124 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 1124 includes a GPIO (general purpose IO) and EMIF (extended memory interface) block 1130 to provide a mechanism to extend the external off-chip access of the microcontroller 1102, a programmable digital block 1132, a programmable analog block 1134, and a special functions block 1136, each configured to implement one or more of the subcomponent functions. In various embodiments, the special functions block 1136 may include dedicated (non-programmable) functional blocks and/or include one or more interfaces to dedicated functional blocks, such as USB, a crystal oscillator drive, JTAG, and the like.

The programmable digital block 1132 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 1132 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 1104) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 1134 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 1134 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

The embodiments described herein may be used in various designs of mutual-capacitance sensing systems, in self-capacitance sensing systems, or combinations of both. In one embodiment, the capacitance sensing system detects multiple sense elements that are activated in the array and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. A method comprising:
   determining a first model configured to recognize a phrase based on a set of training utterances;
   analyzing the set of training utterances using the first model to determine a second model, the second model comprising a training state sequence for each of the set of training utterances, and wherein each training state sequence indicates a likely state for each time interval of a corresponding training utterance; and
   determining whether a detected utterance corresponds to the phrase based on a concatenation of the first model and the second model.

2. The method of claim 1, wherein determining whether the detected utterance corresponds to the phrase comprises:
   determining a state sequence of the detected utterance that indicates a likely state for each time interval of the detected utterance; and
   determining a distance between each training state sequence and the state sequence of the detected utterance to generate a set of distances.

3. The method of claim 2, wherein determining whether the detected utterance corresponds to the phrase further comprises:
determining a likelihood ratio of the detected utterance using the first model; and
determining whether the detected utterance corresponds to the phrase based at least in part on the likelihood ratio of the detected utterance and a minimum distance among the set of distances.

4. The method of claim 3, wherein determining that the minimum distance among the set of distances is below a threshold indicates that the detected utterance corresponds to the phrase.

5. The method of claim 1, wherein the second model comprises a parameter for each of the set of training utterances, the parameter comprising a likelihood ratio over time such that the second model comprises an indication of the likelihood ratio over time for each of the set of training utterances.

6. The method of claim 5, wherein determining whether the detected utterance corresponds to the phrase comprises:
determining a likelihood ratio over time of the detected utterance; and
determining a distance between the likelihood ratio over time of each training utterance and the likelihood ratio over time of the detected utterance to generate a set of distances.

7. The method of claim 6, wherein determining whether the detected utterance corresponds to the phrase further comprises:
determining a likelihood ratio of the detected utterance using the first model; and
determining whether the detected utterance corresponds to the phrase based at least in part on the likelihood ratio of the detected utterance and a minimum distance among the set of distances.

8. A system comprising:
a memory; and
a processing device, operatively coupled to the memory, the processing device configured to:
determine a first model configured to recognize a phrase based on a set of training utterances;
analyze the set of training utterances using the first model to determine a second model, the second model comprising a training state sequence for each of the set of training utterances, and wherein each training state sequence indicates a likely state for each time interval of a corresponding training utterance; and
determine whether a detected utterance corresponds to the phrase based on a concatenation of the first model and the second model.

9. The system of claim 8, wherein to determine whether the detected utterance corresponds to the phrase, the processing device is configured to:
determine a state sequence of the detected utterance that indicates a likely state for each time interval of the detected utterance; and
determine a distance between each training state sequence and the state sequence of the detected utterance to generate a set of distances.

10. The system of claim 9, wherein to determine whether the detected utterance corresponds to the phrase, the processing device is further configured to:
determine a likelihood ratio of the detected utterance using the first model; and
determine whether the detected utterance corresponds to the phrase based at least in part on the likelihood ratio of the detected utterance and a minimum distance among the set of distances.

11. The system of claim 10, wherein the processing device is further configured to:
compare the minimum distance among the set of distances to a threshold; and
in response to determining that the minimum distance among the set of distances is below the threshold, indicate that the detected utterance corresponds to the phrase.

12. The system of claim 8, wherein the processing device is further configured to:
determine, for each training utterance, a likelihood ratio over time of the training utterance, wherein the second model further comprises an indication of the likelihood ratio over time of each training utterance.

13. The system of claim 12, wherein to determine whether the detected utterance corresponds to the phrase, the processing device is configured to:
determine a likelihood ratio over time of the detected utterance; and
determine a distance between the likelihood ratio over time of each training utterance and the likelihood ratio over time of the detected utterance to generate a set of distances.

14. The system of claim 13, wherein to determine whether the detected utterance corresponds to the phrase, the processing device is further configured to:
determine a likelihood ratio of the detected utterance using the first model; and
determine whether the detected utterance corresponds to the phrase based on the likelihood ratio of the detected utterance and a minimum distance among the set of distances.

15. A non-transitory computer-readable medium having instructions stored thereon which, when executed by a processing device, cause the processing device to:
determine a first model configured to recognize a phrase based on a set of training utterances;
analyze the set of training utterances using the first model to determine a second model, the second model comprising a training state sequence for each of the set of training utterances, and wherein each training state sequence indicates a likely state for each time interval of a corresponding training utterance; and
determine whether a detected utterance corresponds to the phrase based on a concatenation of the first model and the second model.

16. The non-transitory computer-readable medium of claim 15, wherein to determine whether the detected utterance corresponds to the phrase, the processing device is to:
determine a state sequence of the detected utterance that indicates a likely state for each time interval of the detected utterance; and
determine a distance between each training state sequence and the state sequence of the detected utterance to generate a set of distances.

17. The non-transitory computer-readable medium of claim 16, wherein to determine whether the detected utterance corresponds to the phrase, the processing device is further to:
determine a likelihood ratio of the detected utterance using the first model; and
determine whether the detected utterance corresponds to the phrase based at least in part on the likelihood ratio of the detected utterance and a minimum distance among the set of distances.

18. The non-transitory computer-readable medium of claim 17, wherein in response to determining that the minimum distance among the set of distances is below a threshold, the processing device determines that the detected utterance corresponds to the phrase.

19. The non-transitory computer-readable medium of claim 18, wherein the second model comprises a parameter for each of the set of training utterances, the parameter comprising a likelihood ratio over time such that the second model comprises an indication of the likelihood ratio over time for each of the set of training utterances.

20. The non-transitory computer-readable medium of claim 19, wherein to determine whether the detected utterance corresponds to the phrase, the processing device is to:
  determine a likelihood ratio over time of the detected utterance; and
  determine a distance between the likelihood ratio over time of each training utterance and the likelihood ratio over time of the detected utterance to generate a set of distances.

21. The non-transitory computer-readable medium of claim 20, wherein to determine whether the detected utterance corresponds to the phrase, the processing device is further to:
  determine a likelihood ratio of the detected utterance using the first model; and
  determine whether the detected utterance corresponds to the phrase based at least in part on the likelihood ratio of the detected utterance and a minimum distance among the set of distances.

* * * * *